Patented May 2, 1939

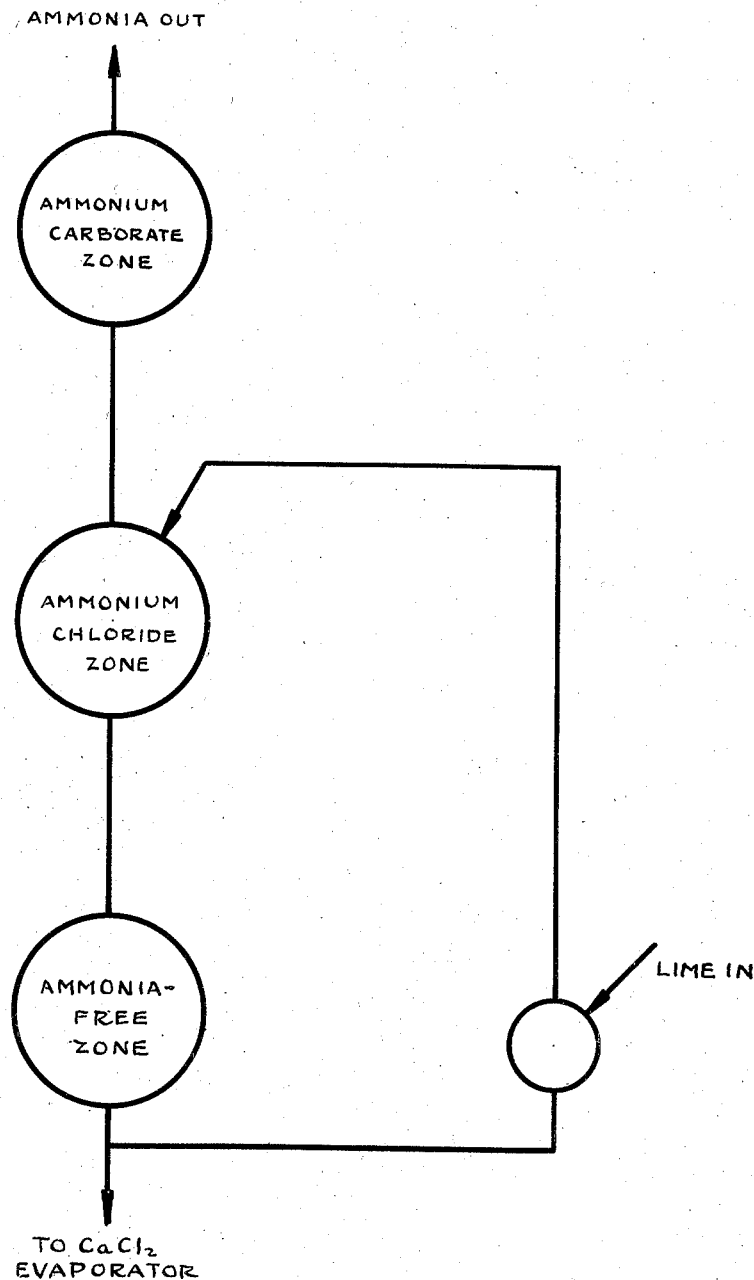

2,156,843

UNITED STATES PATENT OFFICE 2,156,843

PROCESS FOR INTRODUCING LIME INTO STILLS FOR THE RECOVERY OF AMMONIA

John C. Garrels and Howard Roderick, Grosse Ile, Mich., assignors to Michigan Alkali Company, Wyandotte, Mich., a corporation of Michigan Application August 6, 1935, Serial No. 34,942

1 Claim. (Cl. 202—57)

In the operation of stills for the recovery of ammonia existing as ammonium chloride, it is necessary to use lime to free the ammonia, so that it may be thereafter removed from solution by the application of heat. The recovery of ammonia in the ammonia-soda process is an example.

The usual method for introducing this lime into the system is to slake quicklime, CaO, in an excess of water and then pump this suspension of hydrated lime in water into the liquors to be distilled after the removal from the latter of substantially all of the ammonium carbonate.

It has long been recognized that the addition of this excess of water to the distillation system is detrimental to the economy of the operation, and that it reduces the concentration of the dissolved salts in the blow-off liquor from the still, which requires the expenditure of greater amounts of heat for concentration when such blow-off liquors are used for the recovery of the valuable salts contained therein. Various other methods of introducing dry quicklime, or dry hydrated lime, have been proposed, as disclosed by Lunge, Volume III, pp. 109 and 110, 1896; Parish, The Design and Working of Ammonia Stills, p. 143, 1924; and the United States patent to Means, No. 1,845,030. Such various other methods have also contemplated the addition of lime under a pressure or vacuum, requiring additional apparatus and adding to the difficulties of the process. These procedures heretofore disclosed have involved so many mechanical difficulties that they have not found general favor.

A procedure in which the operations can be carried on with avoidance of the introduction of additional water in the cycle, and yet avoid the difficulties consequent upon the modified practices above noted, is accordingly of special importance and a particular desideratum of the art.

To the accomplishment of the foregoing and related ends, the invention, then, comprises the features hereinafter fully described, and particularly pointed out in the claim, the following description setting forth in detail certain illustrative embodiments of the invention, these being indicative, however, of but a few of the various ways in which the principle of the invention may be employed.

In the annexed drawing the sole figure is a diagrammatic representation, in the form of a flow sheet, showing an embodiment of the invention.

In operating in accordance with the present invention, the treatment of the sodium chloride brine with ammonia and carbon dioxide may be performed in any usual or preferred way, and the ammoniacal liquor is in turn passed through its distillation zone. Normally in the distillation of the liquor in the ammonia-soda process, a multiple plate type of still is employed, and in the upper portion thereof, which may contain either plates or a packing material, the ammonium carbonate is decomposed by heat, and the carbon dioxide together with a portion of the free ammonia is driven off. At some intermediate point where substantially all of the $CO_2$ is driven off, the calcium hydrate is introduced in order to react with the ammonium chloride in the liquor to form calcium chloride and free ammonia, which may be recovered in gaseous form. The discharge liquor, or waste from the bottom of the still, is a solution principally of calcium chloride, with some sodium chloride, and is substantially free of ammonia, both in its fixed and free form. In fact, only a trace of ammonia, i. e., .006 to .012 gram per liter, is ever possibly present in practice. The calcium hydrate may be introduced directly into the still column at a point where the carbon dioxide is substantially all removed, or the liquor at this point may be removed from the column into a separate chamber or tank where the calcium hydrate is introduced, and the mixture then allowed to flow back into the still column, where the balance of the ammonia is stripped from the liquor.

We now recycle a portion of the waste liquor from the bottom of the still back to the distillation zone, first admixing lime, at atmospheric pressure, into this portion. Such mixing or liming is conveniently performed in an open vessel, since there is substantially no ammonia either fixed or free, present. This lime may be either quicklime, CaO, or hydrated lime, $Ca(OH)_2$, prepared by adding just enough water to form the dry powdered $Ca(OH)_2$. We prefer the latter method because the $Ca(OH)_2$ formed is in a more finely divided state than that formed when quicklime is added to the blow-off liquor, and therefore it is easier to maintain it in suspension, and it is more rapid in its reaction with ammonium chloride. The dry calcium hydrate thus formed may be screened to remove particles of undesirable size, or it may be admixed directly with the blow-off liquor and the mixture screened or settled to remove oversized particles.

While the suspension of $Ca(OH)_2$ thus formed in the blow-off liquor may be turned directly back into the lime section of the distillation zone, it is preferable to mix it in a separate mixing chamber and at atmospheric pressure with the liquor taken from the still at a point where the carbonate radical is substantially all removed from solution, and return the entire mixture to the distillation zone at a point just below that from which it was taken.

The amount of the blow-off, or waste, liquor thus taken from the bottom of the distillation zone and limed may vary. A convenient practice involves recycling about 20 to 25%, but other amounts may be used, as the quantity recycled does not affect the concentration of the calcium chloride in the blow-off liquor.

We have found that where the still is operated according to the present process, other operating conditions remaining the same, the formation of calcium sulphate scale on the surfaces of the distillation zone is inhibited. In customary practice, the deposit of scale in the lime section of the distillation zone is of such magnitude that the efficiency and capacity of the still is progressively and materially cut down, and periodically, with frequence, it is necessary to shut down the still and mechanically chip and cut the scale from the still surfaces, thus entailing considerable expense, as well as loss of use of the equipment for the time.

The active agent in the scaling of the still surfaces is calcium sulphate, and the solubility of this salt is lower in higher concentrations of calcium chloride, and the lesser hydrated forms are less soluble than the higher hydrated forms. Also in higher concentrations of calcium chloride, the temperature at which the more highly hydrated forms of calcium sulphate are converted to the lesser hydrated forms, is lower. It will thus be seen that in employing our present process, we have increased the concentration of calcium chloride in the still liquors and thus have inhibition of calcium sulphate scale on the still surfaces, and also an extraordinarily concentrated final liquor for recovery of the calcium chloride.

The run-off liquor from the bottom of the still, a portion of which is thus limed and recirculated, is retrieved for its calcium chloride content, the liquor being used for this purpose in such detailed manner as desired; for instance, more or less concentration to standardized commercial solution, or crystallizing, or granulating, etc. Of the total waste liquor, or run-off from the distillation zone, a portion as noted is thus recycled back into the process, while another portion is retrieved for its calcium chloride content.

A further very notable advantage of the process here becomes manifest, in that since it is desirable to maintain a definite lime concentration in the run-off liquor, the recycling of an appreciable portion of the latter occasions a corresponding lessening of the amount of lime otherwise leaving the cycle without any benefit on the yield of soda. At the same time, such calcium as is taken out of the system is in a form profitable as calcium chloride.

Furthermore, since the solubility of calcium sulphate is lower in higher concentrations of calcium chloride, it will be seen that the run-off liquor from the still will have a lower calcium sulphate content when using our process. The value of this is apparent, because in the recovery of calcium chloride from these liquors, it is customary to remove before evaporation a considerable portion of the calcium sulphate contained in solution in order to avoid excessive fouling of the evaporation surfaces and to produce a purer product. This removal of calcium sulphate involves considerable expense, and the smaller the amount necessary to remove, the lower the expense.

Other modes of applying the principle of the invention may be employed, change being made as regards the details described, provided, however, the features stated in the following claim or the equivalent of such, be employed.

We therefore particularly point out and distinctly claim as our invention:

In ammonia distillation, the steps of distilling ammonia from ammoniacal liquor to which lime has been added to remove fixed and free ammonia therefrom, diverting a portion of the final waste liquor from which such free and fixed ammonia has been so removed, adding dry lime as the ammonia freeing agent to such diverted waste liquor and then returning the latter to the ammonia distillation zone for reacting with the incoming ammoniacal liquor, thereby avoiding water dilution of residual products from the distillation.

JOHN C. GARRELS.
HOWARD RODERICK.